(12) United States Patent
Kobyakov

(10) Patent No.: US 7,216,542 B2
(45) Date of Patent: May 15, 2007

(54) THREE-COMPONENT PIEZOELECTRIC VIBRATION ACCELEROMETER PROVIDED WITH A SENSOR

(76) Inventor: Igor Borisovich Kobyakov, ul. Arbat, 44-66, Moscow (RU) 119002

( * ) Notice: Subject to any disclaimer, the term of this patent is extended or adjusted under 35 U.S.C. 154(b) by 0 days.

(21) Appl. No.: 10/569,478

(22) PCT Filed: Jan. 15, 2003

(86) PCT No.: PCT/RU03/00006

§ 371 (c)(1),
(2), (4) Date: Feb. 22, 2006

(87) PCT Pub. No.: WO2004/051285

PCT Pub. Date: Jun. 17, 2004

(65) Prior Publication Data

US 2006/0288780 A1    Dec. 28, 2006

(30) Foreign Application Priority Data

Nov. 29, 2002   (RU) ............................... 2002132201

(51) Int. Cl.
*G01P 15/09* (2006.01)
(52) U.S. Cl. ................................................. 73/514.34
(58) Field of Classification Search ............. 73/514.34, 73/514.33, 514.16, 514.36, 514.38, 514.29, 73/504.12, 504.15
See application file for complete search history.

(56) References Cited

U.S. PATENT DOCUMENTS

| | | | |
|---|---|---|---|
| 3,805,097 A * | 4/1974 | Yanchich et al. ........... 310/329 |
| 4,088,907 A * | 5/1978 | Jones et al. ................. 310/333 |
| 5,905,201 A * | 5/1999 | Petri ........................ 73/504.03 |
| 6,796,181 B2 * | 9/2004 | Tanaka et al. ........... 73/514.34 |

* cited by examiner

*Primary Examiner*—Helen C. Kwok
(74) *Attorney, Agent, or Firm*—patenttm.us; James H. Walters

(57) ABSTRACT

The inventive device comprises a piezo element, embodied in the form of a square based rectangular parallelopiped fixed to a substrate. A piezo module matrix is embodied in a given shape. A conductive layer is made of a conductive glue. The edges of said rectangular parallelopiped are devoid of said conductive layer which is embodied in the form of a rectangle on each side face. For each side face, a charge is picked-up at one point which is located in the area of one of angular points of the conductive rectangle of the side face. The substrate is embodied such that it is conductive. The square base is fixed to the substrate by use of a conductive glue which is also used for the conductive layer.

20 Claims, 2 Drawing Sheets

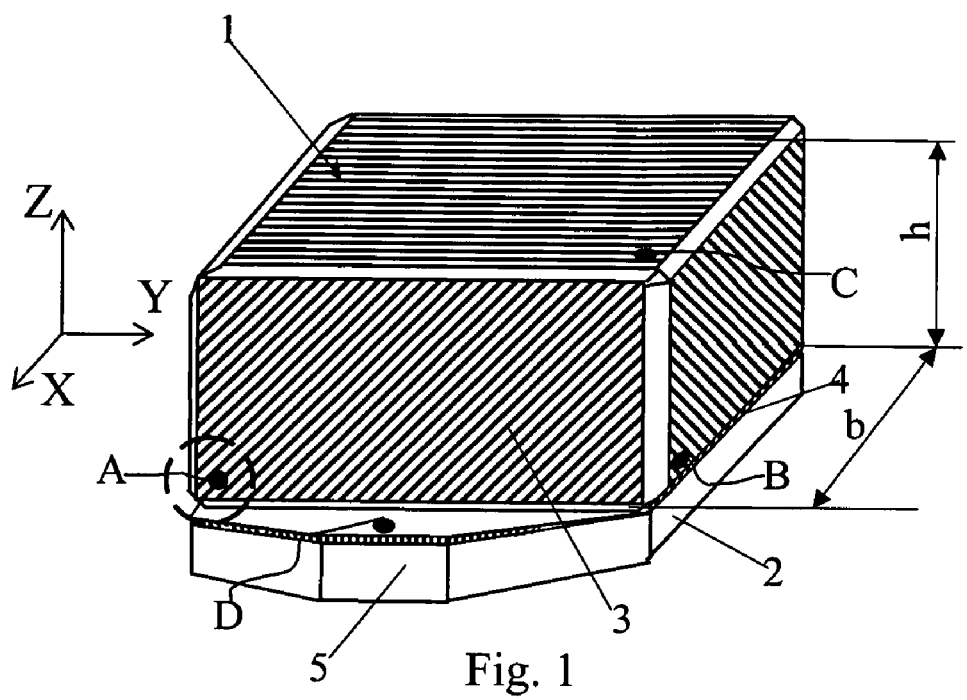
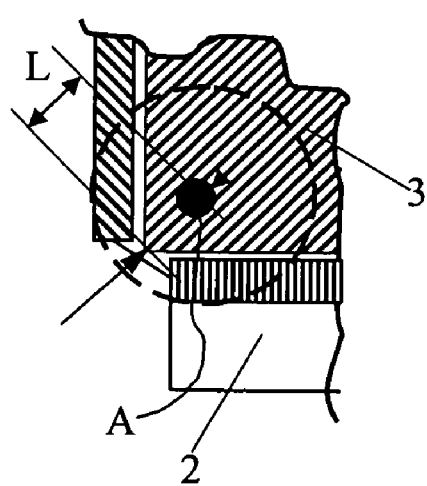
Fig. 2
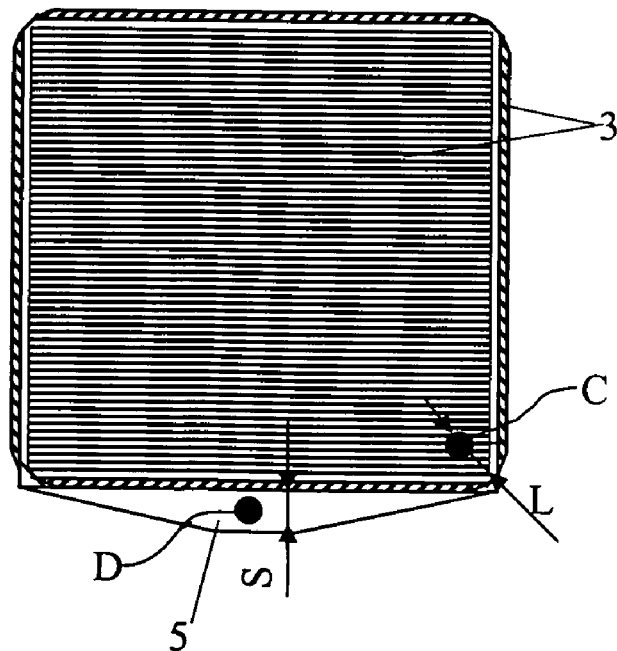
Fig. 3

THREE-COMPONENT PIEZOELECTRIC VIBRATION ACCELEROMETER PROVIDED WITH A SENSOR

FIELD OF THE INVENTION

The invention relates to measuring equipment, in particular to devices for measuring vibration parameters of various machinery and mechanisms.

PRIOR ART

The operation principle of the existing one-component piezoelectric transducers is based on measuring a projection of a vibration acceleration vector on the transducer measurement axis. In order to measure the magnitude and direction of a vibration acceleration vector in a given measurement point three-component vibration accelerometers are used, which have three sensors and, at best, a common inertial weight. But, since sensing piezoelectric cells are constructively separated in a space and may not be reduced to a single measurement point, various vibrations, differing from the actual vibration parameters that are to be measured, dominate in the area where piezoelectric cells are fixed. Therefore, data, which is obtained on three coordinate axes with the use of such transducers, does not enable to measure the actual magnitude and the real direction of a vibration acceleration vector. This, however, may be avoided, provided only one piezoelectric cell is used in a transducer, which transforms a given vibration direction into electric charges on the respective pair of the opposite faces. The piezoelectric properties of crystals are described by a third-rank tensor having, in a common case, 18 independent constants. With due regard to the symmetry of a crystal which a piezoelectric cell is made of, it is possible to transform one deformation, caused by vibration acceleration randomly oriented into a space, into three electric charges on three opposite faces of a rectangular parallelepiped.

Known in the art is a three-component piezoelectric vibration accelerometer with one sensor, which has a piezoelectric cell made in the form of a rectangular parallelepiped fixed to a substrate, wherein the polar axis of the piezoelectric cell being perpendicular to its plane of fixation to the substrate and a piezo module matrix is selected so as to be of the following kind:

$$\begin{vmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{vmatrix}$$

where $d_{ij}$—a piezo module (C/N),
i—index of a piezoelectric field,
j—deformation index.
(SU, A, 504940).

In the said device all six faces of the piezoelectric cell are coated with a thin layer of a metal and electrically disconnected. The piezoelectric cell is rigidly fixed to the transducer substrate and has an inertial weight in the form of a plate arranged on the top face of the rectangular parallelepiped. While using this method of fixing a piezoelectric cell, only three kinds of deformation are possible, namely: tension—compression along the polar axis Z, shift in the XZ-plane, shift in the YZ-plane, which results in that charges for each of them develop only on two opposite faces of a rectangular parallelepiped in accordance with the piezo module matrix.

The said matrix describes the piezoelectric properties of crystals, which relate to the crystallographic classes $C_{2v}$, $C_{4v}$, $C_{6v}$, $C_{8v}$. For example, mono-crystals CdS and ZnO relate to the $C_{6v}$ class and piezoceramics relates to the $C_{8v}$ class.

The closest device is a three-component piezoelectric vibration accelerometer with one sensor, comprising a piezoelectric cell made in the form of a rectangular parallelepiped with a square base, a substrate to which the square base of the rectangular parallelepiped is fixed, a conductive layer applied to the faces of the rectangular parallelepiped, wherein the edges of the rectangular parallelepiped being devoid of that conductive layer so as each face of the rectangular parallelepiped is electrically isolated from the other faces, the conductive layer on each face being applied in the form of a rectangle which opposite faces are parallel to the respective opposite edges of a face of the rectangular parallelepiped, at that the polar axis of the piezoelectric cell being perpendicular to the plane of fixing it to the substrate, the relation between the height h of the rectangular parallelepiped and the length b of a side of the square base being selected from the relation 0.3<h/b<1.2, and the piezo module matrix of the piezoelectric cell being selected so as to be of the following kind:

$$\begin{vmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{vmatrix}$$

where $d_{ij}$—a piezo module (C/N),
i—index of a piezoelectric field,
j—deformation index.
(RU, A, 2061242).

In this device the conductive layer is made by metallizing the faces, and the rectangular parallelepiped is made of piezoceramics or a mono-crystal with the dielectric permeability e not less than 500. Due to the selection of a corresponding material and geometric dimensions of a piezoelectric cell it becomes possible to raise the upper limit of the frequency band and improve the accuracy of measurements, as well as reduce the dimensions of the device due to elimination of the inertial weight from its design.

But a limitation of the known devices is that the piezo module matrix, as described above, ensures the absence of transverse sensitivity on the three axes X, Y, Z only in theory, i.e., for a case where the piezoelectric cell is in a mechanically free state, as well as in a case where mechanical stresses are similar in the whole volume and on the whole surface of the piezoelectric cell. In a real construction of a piezoelectric cell local mechanical stresses develop due to fixing the piezoelectric cell to the substrate, due to the presence of the elements (usually soldered) for picking-up charges from the face surfaces, due to quality of the conductive layer. The piezo module matrix of a crystal in a mechanically irregular stressed state changes its type because the components of the tensor (and, consequently, the matrix), which condition the presence of transverse sensitivity, become not equal to zero. This is especially obvious for the side faces of a rectangular parallelepiped, since they experience shift in the XZ-plane and the YZ-plane. If local stresses are sufficiently high, then the transverse sensitivity may reach 30% to 50%, in spite of the fact that the piezoelectric effect of a crystal in a free state is described by the respective ideal matrix. Thus, it is necessary to create a special construction, which would ensure regularity of mechanical stresses developing in a piezoelectric cell, i.e., they should be equal in the whole volume and on the whole surface of a crystal.

DESCRIPTION OF THE INVENTION

The basis of this invention is formed by the task to create a three-component piezoelectric vibration accelerometer with one sensor, which would ensure an improved accuracy due to decreasing the transverse sensitivity, would improve the reliability of a construction and measurements and, thus, would have improved performance characteristics.

For solving this task a known three-component piezoelectric vibration accelerometer with one sensor, which comprises a piezoelectric cell made in the form of a rectangular parallelepiped with a square base, a substrate, to which the square base of the rectangular parallelepiped is fixed, and a conductive layer applied to the faces of the rectangular parallelepiped, the edges of the rectangular parallelepiped are devoid of the said conductive layer in such a way that each face of the rectangular parallelepiped is electrically isolated from the other faces, the conductive layer on each face is made in the form of a rectangle which opposite sides are parallel to the respective faces of the rectangular parallelepiped, wherein the polar axis of the piezoelectric cell is perpendicular to the plane of fixing it to the substrate, the relation between the height h of the rectangular parallelepiped and the length b of the side of the square base is selected from the relation 0.3<h/b<1.2, and the piezo module matrix of the piezoelectric cell being selected so as to be of the following kind:

$$\begin{vmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{vmatrix}$$

where $d_{ij}$—a piezo module (C/N),
i—index of a piezoelectric field,
j—deformation index.

according to the invention the conductive layer is made of a hardened conductive glue, which is also used for fixing the square base of the rectangular parallelepiped to the substrate that is made dielectric, wherein for each side face a charge of the piezoelectric cell is picked up in one of the points located in the area of a vertex of the conductive rectangle on the side face.

Additional embodiments of the invention are possible, wherein it is appropriate that:

for each side face the point, from which a charge of the piezoelectric cell is picked up, would be located at a distance L from a vertex of the conductive rectangle on the side face, the said distance being selected so as to comply with the condition L<0.25 b;

for each side face the point, from which a charge of the piezoelectric cell is picked up, would be located in the area of a vertex of the conductive rectangle on the side face nearest to the substrate;

for the top face a charge of the piezoelectric cell would be picked up from one of points located in the area of a vertex of the conductive rectangle on the top face;

for the top face the point, from which a charge of the piezoelectric cell is picked up, would be located at a distance L from a vertex of the conductive rectangle on the top face, the said distance being selected so as to comply with the condition L<0.25 b;

for the top face the point, from which a charge of the piezoelectric cell is picked up, would be located in the center of the conductive rectangle on the top face;

the substrate would be made so as to extend beyond a side face of the rectangular parallelepiped, the said substrate extension would be provided with a conductive layer made of a conductive glue, wherein a charge being picked up from the square base of the piezoelectric cell in one point located on the substrate extension surface to which the square base of the piezoelectric cell is fixed;

the substrate would be made so as to extend beyond a side face of the rectangular parallelepiped to a distance S not exceeding 0.25 b;

a charge would be picked up by a copper wire having diameter not more than 0.1 mm;

the end of the copper wire would be fixed in the respective point with the same conductive glue that is used for fixing the square base of the rectangular parallelepiped to the substrate;

the distance M between the closest to each other sides of the conductive rectangles on the adjacent faces would be selected in the range from 0.1 to 0.3 mm;

a sealant would be introduced, and the piezoelectric cell together with the substrate would be embodied into the sealant;

as the substrate a plate would be used, which is made of quartz;

a plate would be introduced, made of copper, which would be fixed to the top face of the rectangular parallelepiped with the same conductive glue as is used for fixing the square base of the rectangular parallelepiped to the substrate.

The above advantages as well as the specific features of this invention will be further explained using a preferred embodiment with references to the appended drawings.

BRIEF DESCRIPTION OF THE DRAWINGS

FIG. 1 shows the inventive device.
FIG. 2 shows the point from which a charge is picked up from the side face shown in FIG. 1.
FIG. 3 is a top view of the device shown in FIG. 1.

PREFERRED EMBODIMENT OF THE INVENTION

Figure 4:
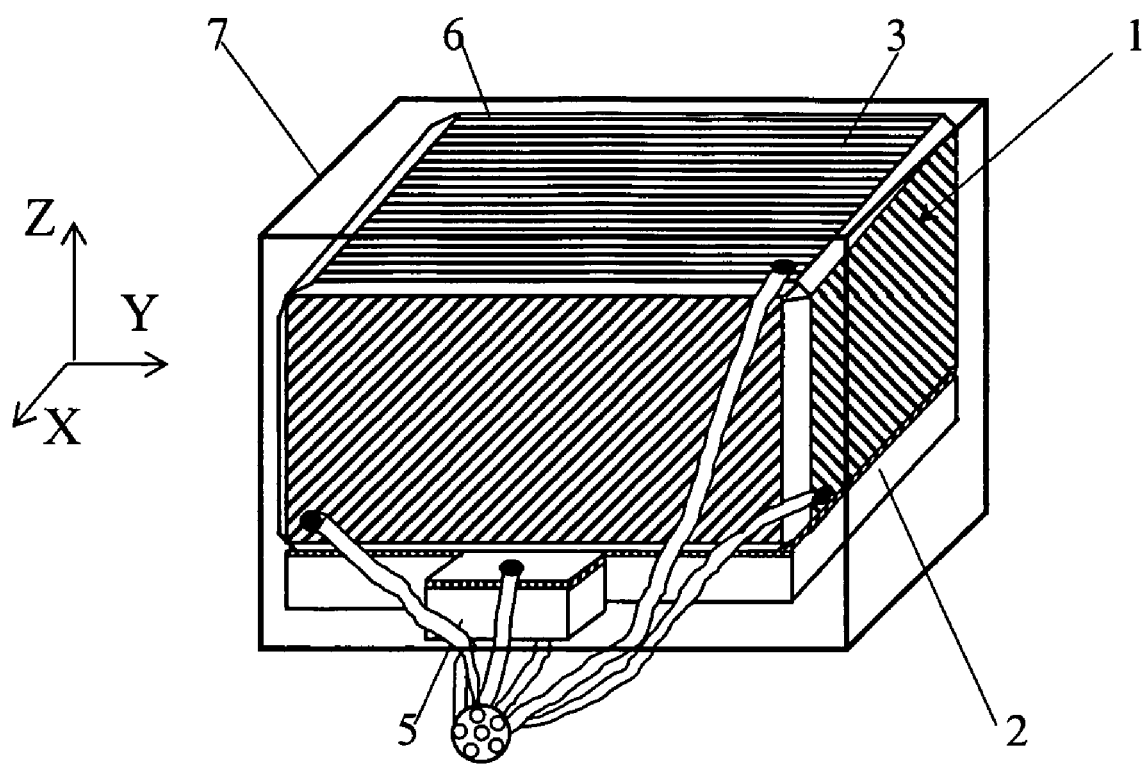
FIG. 4 is the same as FIG. 1 with the wires and a compound.

A three-component piezoelectric vibration accelerometer with one sensor (FIG. 1) comprises a piezoelectric cell 1 made in the form of a rectangular parallelepiped with a square base. The square base is fixed to a substrate 2 (performing the function of an isolating plate for fixing the piezoelectric cell 1 to the sensor body). The polar axis Z of the piezoelectric cell 1 is perpendicular to the plane of fixing it to the substrate 2. The relation between the height h of the rectangular parallelepiped and the length b of a side of the square base is selected from the relation 0.3<h/b<1.2. The piezo module matrix of the piezoelectric cell is selected so as to be of the following kind:

$$\begin{vmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{vmatrix}$$

where $d_{ij}$—a piezo module (C/N),
i—index of a piezoelectric field,
j—deformation index.

All the faces of the rectangular parallelepiped of the piezoelectric cell 1 are provided with the conductive layer 3 made of a conductive glue. All the edges of the rectangular parallelepiped are devoid of that conductive layer 3. Thus, each face of the rectangular parallelepiped is electrically isolated from the adjacent faces. The conductive layer 3 on each side face is made in the form of a rectangle, the opposite sides of which are parallel to the respective opposite edges of the face of the rectangular parallelepiped. For each side face a charge of the piezoelectric cell 1 is picked up in one of points (the points A and B are shown in FIG. 1) located in the area of a vertex of the conductive rectangle 3 on the side face. The substrate 2 is made dielectric. The square base of the rectangular parallelepiped is fixed to the substrate with a conductive glue 4, of which the conductive layer 3 is made.

A specific feature of this invention is the use of the same material both for making the conductive layer 3 and for fixing the piezoelectric cell 1 to the substrate 2. Since the basic error is introduced into measurements by the side faces, the main change of the construction is directed on them. However, it will be obvious for persons skilled in the art that this invention may include various other improvements in the construction, enabling to ensure, to the greatest degree, regularity of mechanical stresses developing in the crystal of the piezoelectric cell 1.

For each side face the point (A or B), from which a charge of the piezoelectric cell 1 is picked up, is located at a distance L from a vertex of the conductive rectangle on the side face, the said distance being selected so as to comply with the condition L<0.25 b.

It is appropriate that, for the purpose of improving the accuracy of measurements, the points A and B (FIG. 1), from which a charge of the piezoelectric cell is picked up, should also be located in the area of a vertex of the rectangle made of the conductive layer 3 on the side face closest to the substrate 2. These areas are the areas of the crystal least deformation.

The conductive layer 3 on the top face (FIGS. 1, 3) is also made in the form of a rectangle. For the top face a charge of the piezoelectric cell 1 is picked up from one of points, e.g., the point C, located in the area of a vertex of the rectangle made of the conductive layer on the top face.

For the top face the point, from which a charge of the piezoelectric cell is picked up, may be located at a distance L (FIG. 3) from a vertex of the rectangle made of the conductive layer on the top face, the said distance being selected so as to comply with the condition L<0.25 b.

Moreover, for the top face a charge of the piezoelectric cell may be also picked up in the point C* (FIG. 5) located in the center of the rectangle (the square, since the square base is used) made of the conductive layer on the top face.

The substrate 2 (FIGS. 1, 3–5) is made so as to extend beyond a side face of the rectangular parallelepiped. The extension 5 of the substrate 2 is provided with the conductive layer 3 made of the said conductive glue. A charge being picked up from the square base of the piezoelectric cell 1 in one point (D) located on the surface extension 5 of the substrate, to which the square base of the piezoelectric cell 1 is fixed. That is, the point D is located on the surface of the extension 5, which is closest and faces to a side face of the rectangular parallelepiped.

The substrate is made so as to extend beyond a side face of the rectangular parallelepiped to a distance S not exceeding 0.25 b.

A charge of the piezoelectric cell 1 is picked up by a copper wire 6 having diameter not more than 0.1 mm (FIG. 4). The end of the copper wire 6 is fixed in the respective point with the same conductive glue that is used for fixing the square base of the rectangular parallelepiped to the substrate.

Figure 5:
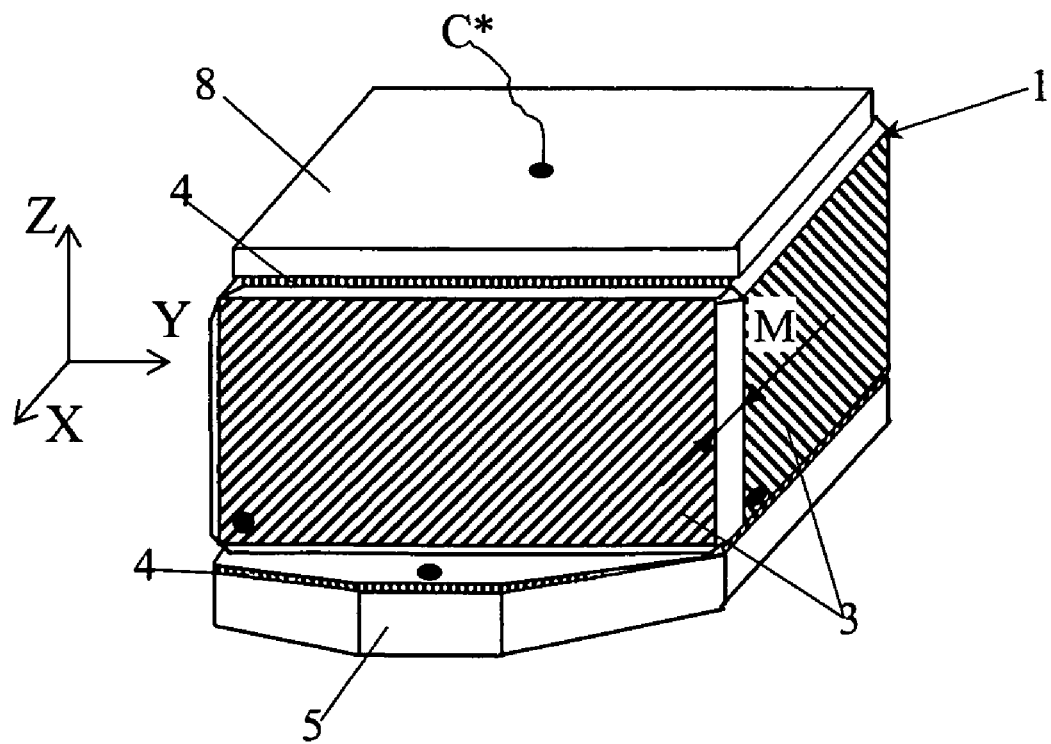
FIG. 5 is the same as FIG. 1 with an inertial weight.

The distance M between the closest to each other sides of the rectangles made of the conductive layer 3 on the adjacent faces is selected in the range from 0.1 to 0.3 mm (FIG. 5).

In order to ensure the rigidity of the construction a sealant 7 may be introduced (a dielectric glue shown in FIG. 4 schematically, in the form of a transparent rectangular parallelepiped). The piezoelectric cell 1 together with the substrate 2 are embodied into the sealant 7.

As the substrate 2 a plate may be used, which is made of quartz.

An inertial weight may be embodied into the device, such as the plate 8 made, e.g., of copper. The plate 8 is fixed to the top face of the rectangular parallelepiped with the conductive glue, of which the conductive layer 3 is made.

The device (FIGS. 1–5) works as follows.

A ceramics polarization vector, which is parallel to the Z-axis, is perpendicular to the plane of fixing the piezoelectric cell 1 to the substrate 2. If vibration is directed along the Z-axis, tensile-compressive deformation arises in the piezoelectric cell in the same direction, and since a crystal is selected with the above piezo module matrix, the piezo module $d_{33}$ is used, and a charge emerges only on the bottom and the top faces of the rectangular parallelepiped, which are perpendicular to the Z-axis.

In a case of vibration along the X-axis, shift deformation is developed in the crystal in the XZ-plane, the piezo module $d_{15}$ is used, and charges emerge only on the faces orthogonal to the X-axis. In a case of vibration along the Y-axis shift deformation is developed in the crystal of the piezoelectric cell 1 in the YZ-plane, and if the piezo module $d_{24}$ is used, charges emerge only on the faces orthogonal to the Y-axis. Since in this construction it is impossible to create tensile-compressive deformation, the piezo modules $d_{31}$ and $d_{32}$ are not used.

If a vibration acceleration vector has a random spatial orientation, then the simultaneous use of three piezo modules $d_{33}$, $d_{15}$, $d_{24}$ would enable to reliably measure its projections on the X, Y, Z axes.

But in the known constructions, where a charge is picked up from the center of the conductive layer 3 applied to rectangle faces and where as the conductive layer 3 a metal layer is used, which is applied, for example, by an evaporation method, it is not possible to ensure the equality of the respective piezo modules of the above matrix to zero. In the result, transverse sensitivity of the piezoelectric cell 1 appears along the three axes X, Y, Z. Indeed, if a usual metal layer is used as the conductive layer 3, and then a crystal is brazed to a metal substrate, mechanical stresses, appearing in the crystal, will be of significant magnitude and, what is most important, they will be different in different areas of the crystal. Even soldering of wires in the corresponding points of fixation results in appearing local mechanical stresses, and piezo modules, having zero value for a free crystal, reach after its mounting, if values for the piezo modules are taken as 100%, magnitudes amounting to 50%.

As studies show, values and irregularity of mechanical stresses may be reduced sharply, if a hardened (dried) layer of a conductive glue is used as the conductive layer 3 and the same conductive glue 4 is used as the layer for fixing a crystal to the substrate. As a conductive glue one may use, e.g., the H27D glue manufactured by Epoxy Technology, USA, or the 3465 or 3466 glue manufactured by Loctite, USA, or the TOK2 conductive glue manufactured in conformance to TU ShKFLO 028.002 by TU-LU, Russia, or the 950 or 952 glue manufactured by Cotronics, USA. Furthermore, in the center of a side face of a rectangular parallelepiped the absolute deformation value of a crystal, working as a vibration accelerometer, reaches its maximum; therefore, in order to improve the accuracy of measurements it is necessary that a charge of the piezoelectric cell 1 is picked up in the area of a vertex of the rectangle made of the conductive layer 3 for each face, e.g., in the points A, B for the side faces and in the point C for the top face. A study was conducted with a group of transducers where wires were glued in the face centers and in the vertexes of the rectangles made of the conductive layer 3. When wires were glued in the face centers the transverse sensitivity was from 13.3% to 30.5% and in the vertexes from 2% to 6%, mainly 2%.

From the bottom face of the piezoelectric cell 1, since it is fixed with the same conductive glue 4 and forms the uniform layer with the other faces, a charge may be picked up in the point D, for which purpose it is necessary to create the extension 5 of the substrate 2, e.g., a substrate made of melted quartz according to GOST 15130-86, and to cover its surface with the same conductive glue 4, which is used for fixing the square base of the piezoelectric cell 1 to the substrate 2. In practice, the substrate 2 is made so as to have greater dimensions. The conductive glue 4 is applied to the whole surface of the substrate 2, which faces the square base of the piezoelectric cell 1. The latter is fixed to the substrate 2 with a small force in order to ensure uniform distribution of the glue layer. Owing to this, the necessary rigidity of fixation of the piezoelectric cell 1 to the substrate 2 is achieved. The conductive glue 4 comes from under the piezoelectric cell 1 onto the extension 5, thus forming a contact area.

In a case where an inertial weight, such as the plate 8 (FIG. 5) is used, which improves the sensitivity of the device, but lowers the upper limit of the frequency band, it is appropriate to fix the plate 8 to the top face with the same conductive glue 4, of which the conductive layer 3 is made.

The device is manufactured as follows.

The whole surface of the piezoelectric cell 1 is covered with a conductive glue so as to form a layer having the thickness not more than 0.1 mm. After the layer has dried, the edges of the rectangular parallelepiped are ground by the magnitude M being in the range from 0.1 mm to 0.3 mm, thus obtaining rectangles of the conductive layer 3 on the faces, the said rectangles being electrically isolated from each other. Then the conductive glue is applied to the substrate 2 and on the plate 8, provided the latter is used. The top and the bottom faces of the rectangular parallelepiped are pressed to these components and held until the conductive glue is dried. Then the respective ends of wires are glued to the above-indicated points for picking up a charge of the piezoelectric cell 1. The above-indicated distance values for L and S have been obtained experimentally and enable to achieve the best results. Copper wires without insulation, having the diameter up to 0.1 mm and possessing small rigidity, are used as the above-said wires. Then, after gluing the wires, the construction is embodied in the sealant 7. The isolating glue "Epoxyl", conforming to RVITs 460 077.044 TU, is used as the sealant 7. The device is placed in a titanium case (not shown in the drawings), and the other ends of the wires are soldered to a connector.

INDUSTRIAL APPLICABILITY

The three-component piezoelectric vibration accelerometer with one sensor may be most successfully used in equipment for bench and operation measurements in various mechanical engineering fields, primarily in rocket, aircraft and helicopter production, as well as for scientific purposes.

The invention claimed is:

1. A three-component piezoelectric vibration accelerometer with a sensitive element, comprising a piezoelectric cell made in the form of a rectangular parallelepiped with a square base, a substrate to which the said square base of the rectangular parallelepiped is fastened, a current-conducting layer located on faces of the rectangular parallelepiped, wherein edges of the rectangular parallelepiped being made free of the said current-conducting layer in such a way that each face of the rectangular parallelepiped being electrically isolated from the other faces, the current-conducting layer on each of the faces being made in the form of a rectangle the opposite sides of which being respectively parallel to the opposite edges of that face, a polar axis of the piezoelectric cell is perpendicular to the plane of fastening the piezoelectric cell to the substrate, the relation of the height h of the rectangular parallelepiped to the length b of the square base side is selected from the relation $0.3<h/b<1.2$, and the matrix of piezoelectric cell modules is selected to be of the following type:

$$\begin{vmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{vmatrix}$$

where $d_{ij}$ is a piezoelectric cell module (C/N), i is the piezoelectric field index, j is the deformation index, characterized in that the current-conducting layer is made of a hardened current-conducting glue used for fastening the square base of the rectangular parallelepiped to the substrate that is made dielectric, wherein for each of the side faces a piezoelectric cell charge pickup being made in one point located in the area of a vertex of the current-conducting layer on the side face.

2. The vibration accelerometer with a sensitive element according to claim 1, characterized in that for each of the side faces a point, from which the piezoelectric cell charge pickup is made, is located at a distance L from a vertex of the current-conducting layer of the rectangular parallelepiped on that side face, the said distance being selected so as to comply with the condition $L<0.25\,b$.

3. The vibration accelerometer with a sensitive element according to claim 1, characterized in that for each of the side faces a point, from which the piezoelectric cell charge pickup is made, is located at a distance L from in the area of a vertex of the current-conducting layer of the rectangular parallelepiped on the side face closest to the substrate.

4. The vibration accelerometer with a sensitive element according to claim 1, characterized in that for an upper face the piezoelectric cell charge pickup is made in a point located in the area of a vertex of the current-conducting layer rectangle on the upper face.

5. The vibration accelerometer with a sensitive element according to claim 4, characterized in that for an upper face the point, from which the piezoelectric cell charge pickup is made, is located at a distance L from a vertex of the current-conducting layer of the rectangular parallelepiped on the upper face, the said distance being selected so as to comply with the condition L<0.25 b.

6. The vibration accelerometer with a sensitive element according to claim 1, characterized in that for an upper face the piezoelectric cell charge pickup is made in a point located in the center of the current-conducting layer of the rectangular parallelepiped on the upper face.

7. The vibration accelerometer with a sensitive element according to claim 1, characterized in that the substrate is made projected beyond a side face of the rectangular parallelepiped, the substrate projection is provided with a current-conducting layer made of a current-conducting glue, the charge pickup from the square base of the piezoelectric cell being made in a point located on the surface of the substrate projection, to which the square base of the piezoelectric cell is fastened.

8. The vibration accelerometer with a sensitive element according to claim 7, characterized in that the substrate is made projected beyond a side face of the rectangular parallelepiped to a distance S not exceeding 0.25 b.

9. The vibration accelerometer with a sensitive element according to claim 1, characterized in that the charge pickup from the respective point is made with a copper wire having a diameter not more than 0.1 mm.

10. The vibration accelerometer with a sensitive element according to claim 9, characterized in that one end of the copper wire is fastened in the point by the same current-conducting glue, which is used for fastening the square base of the rectangular parallelepiped to the substrate.

11. The vibration accelerometer with a sensitive element according to claim 1, characterized in that the distance M between the closest sides of the current-conducting layer of the rectangular parallelepipeds on the adjacent faces is selected in the range from 0.1 to 0.3 mm.

12. The vibration accelerometer with a sensitive element according to claim 1, characterized in that a sealant is introduced and the piezoelectric cell with the substrate is enclosed with the sealant.

13. The vibration accelerometer with a sensitive element according to claim 1, characterized in that a plate made of quartz is used as the substrate.

14. The vibration accelerometer with a sensitive element according to claim 1, characterized in that a plate made of copper is introduced, which is fastened to the upper face of the rectangular parallelepiped with the same current-conducting glue, which is used for fastening the rectangular parallelepiped square base to the substrate.

15. The vibration accelerometer with a sensitive element according to claim 4, characterized in that the charge pickup from the respective point is made with a copper wire having a diameter not more than 0.1 mm.

16. The vibration accelerometer with a sensitive element according to claim 15, characterized in that one end of the copper wire is fastened in the point by the same current-conducting glue, which is used for fastening the square base of the rectangular parallelepiped to the substrate.

17. The vibration accelerometer with a sensitive element according to claim 6, characterized in that the charge pickup from the respective point is made with a copper wire having a diameter not more than 0.1 mm.

18. The vibration accelerometer with a sensitive element according to claim 17, characterized in that one end of the copper wire is fastened in the point by the same current-conducting glue, which is used for fastening the square base of the rectangular parallelepiped to the substrate.

19. The vibration accelerometer with a sensitive element according to claim 7, characterized in that the charge pickup from the respective point is made with a copper wire having a diameter not more than 0.1 mm.

20. The vibration accelerometer with a sensitive element according to claim 19, characterized in that one end of the copper wire is fastened in the point by the same current-conducting glue, which is used for fastening the square base of the rectangular parallelepiped to the substrate.

* * * * *